United States Patent

[11] 3,600,754

| [72] | Inventor | Anton Johannes Vox<br>Ruit, Germany |
|---|---|---|
| [21] | Appl. No. | 807,812 |
| [22] | Filed | Mar. 17, 1969 |
| [45] | Patented | Aug. 24, 1971 |
| [73] | Assignee | Thermovox G.m.b.H.,<br>Kunststoffmaschinen<br>Ruit, Germany |
| [32] | Priority | Mar. 20, 1968 |
| [33] | | Germany |
| [31] | | P 17 78 011.9 |

[54] ROTATIONAL CASTING APPARATUS
9 Claims, 3 Drawing Figs.
[52] U.S. Cl.................................................. 18/26 RR,
18/2 I
[51] Int. Cl................................................... B29c 5/00
[50] Field of Search........................................ 18/26 R
(RR), 2 I (HA), 17 C, 2.5 R (RR), 2.4, 13 R (RR),
13 L, 15 M (R), 26 M (R), 30 GR

[56] References Cited
UNITED STATES PATENTS
924,787  6/1909  Janney .......................... 91/199

| 1,867,225 | 7/1932 | LeVan et al. ................. | 18/2 I |
| 2,659,107 | 11/1953 | DeBell.......................... | 18/26 R |
| 3,072,965 | 1/1963 | Miller........................... | 18/2 I |
| 3,454,988 | 7/1969 | Cremer ......................... | 18/26 R |

Primary Examiner—J. Spencer Overholser
Assistant Examiner—David S. Safran
Attorney—Karl F. Ross ABSTRACT: A rotational casting apparatus has drive means for rotating a hollow mold about two mutually transverse axes. The rotation about at least one of these axes can be periodically reversed by a control apparatus to rock or oscillate the mold through an angle of less than 360°. This control system includes a double-acting pneumatic cylinder connected via a rack to a control pinion of a reversible, adjustable hydraulic motor connected to the mold. Switches actuatable by the rack control reversal of this cylinder via pneumatic valves. A stop switch actuatable by the yoke carrying the mold can stop the mold at a predetermined angular setting for rocking while a timer controls the sequence of operation of the apparatus.

ROTATIONAL CASTING APPARATUS

My present invention relates to a rotational casting apparatus for forming large hollow bodies from synthetic resins.

Rotational casing consists of the method of forming usually hollow bodies by rotating a hollow mold about two mutually transverse axes while slowly cooling a thermoplastic melt in the mold. As the slowly cooling mold rotates, the melt adheres to the internal walls and eventually fully coats the inside of the mold to produce a hollow body with more or less uniform wall thickness. In a process often called rotational molding or rotomolding a sinterable thermoplastic powder is used in the place of the liquid resin. If a thermosetting melt is used the mold is heated to harden the material against the mold walls. A further rotational casting process provides for the charging of a thermoplastic plastisol or the like into the mold, then heating of the mold to distribute it therein, and finally cooling the mold to harden and cure the distributed resin.

Such a method is very practical for creating large, seamless hollow bodies. The finished product is completely unitary and homogeneous, and thus capable of withstanding great stress.

However, it is often desirable to produce tanks or containers by the above-described method with flanges, connection nipples, or other irregular formations with sharp edges or relatively massive or reinforced formations. Where such formations are to be provided at a sharp ridge or projection on the inside of the mold, the fluid or semifluid material will not as readily maintain a uniform layer. Thus undesirable weak, thin portions of the walls of the finished cast product will exist.

One solution to this problem has been simply to avoid such formations by appropriate mold design, or to add them later by thermal welding or a similar process. This, however, defeats largely the main advantages or rotational casting.

It is therefore the principal object of my present invention to provide an improved rotational casting apparatus.

A more specific object is to provide such an apparatus which overcomes the above-described disadvantage.

Thus, another object of my invention is to provide a rotational casting apparatus that can form large hollow bodies with irregular projections without weakened wall portions.

I attain the above and other objects, which will become apparent thereinafter, with a rotational casting apparatus having a mold rotatable about two mutually transverse axes, respective drive means in the form of reversible hydraulic motors for rotating the mold about each of these axes, and control means for the hydraulic motors allowing rocking of the mold about at least one of these axes; the mold is of the double-wall type to which heating and cooling fluid media can be fed to liquefy the resin and promote solidification during the rocking action. The control means is arranged to rock or oscillate the mold about one axis as noted above while the mold rotates about the other, or while the mold is prevented from rotating about the other axis. Alternatively, the mold can be rocked about both axes simultaneously.

Such a rocking or oscillating motion causes the buildup of the coating of the thermoplastic melt in one portion of the mold so that the cast body will be proportionately thicker there. In the case of a circumferential flange rocking about an axis generally parallel to the plane of the flange with the flange portion held generally lower than the rest of the mold and rotation about an axis transverse thereto serves to circumferentially thicken the finished body. Rocking about both mutually transverse axes at the same time thickens just the portion of the wall of the body at the lowest point in the mold during the rocking, e.g. to form a massive portion adapted to receive plumbing fittings or the like.

My apparatus functions automatically by virtue of a programmer including a timer which regulates both the control means and the heating and/or cooling of the mold. This timer thus establishes the duration of simple rotation of the mold about one or both axis to thoroughly coat the entire interior of the mold; the timer means may, thereafter, initiate a rocking of the mold to thicken some particular area. The heating and/or cooling periods and their start and termination are also established by the timer means.

A further means or stop is provided in conjunction with this timer so that, once the original rotation of the mold is stopped and the rocking is to begin, the mold is stopped in the correct predetermined angular setting and the rocking is begun about the correct center point which corresponds to the region of the plastic body to be thickened.

More specifically, the double-wall mold is retained on a rotatable disk or plate which is in turn held in the offset height of a rotatable yoke in the form of a crankshaft and between radial shanks of the yoke. An infinitely regulatable reversible, variable speed hydraulic motor drives the yoke and has a regulating pinion that is engaged by a toothed rack. The hydraulic motor has a null or stationary position of the pinion in which the motor is immobilized and rotates in opposite senses upon movement of the pinion to either side of the null position. As this rack is moved to either side of its center position, therefore, the speed of the motor increases in one or the other rotational sense. A pneumatic double-acting cylinder moves this rack back and forth and is itself actuated by a reversing valve coupled to two limit and a center switch which are actuated by the rack in its respective positions. Thus, as the rack hits one limit switch, it reverses the valve and starts moving the rack back to change the sense of rotation of the yoke. A stop switch engageable with the yoke coacts with the center switch to stop the yoke completely in a predetermined angular position prior to starting a pendulum like action.

According to other features of my invention the speed at which the rack shifts can be greatly decelerated to a creep through the action of two creep switches inboard of the limit switches.

My invention has the advantages that once charged and started the apparatus automatically thickens the portion or portions of the body which are to be thickened, and follows its whole cycle otherwise with no need of supervision.

The above and other objects, features, and advantages of my invention will be described in the following, with reference to the drawing in which.

Figure 1:
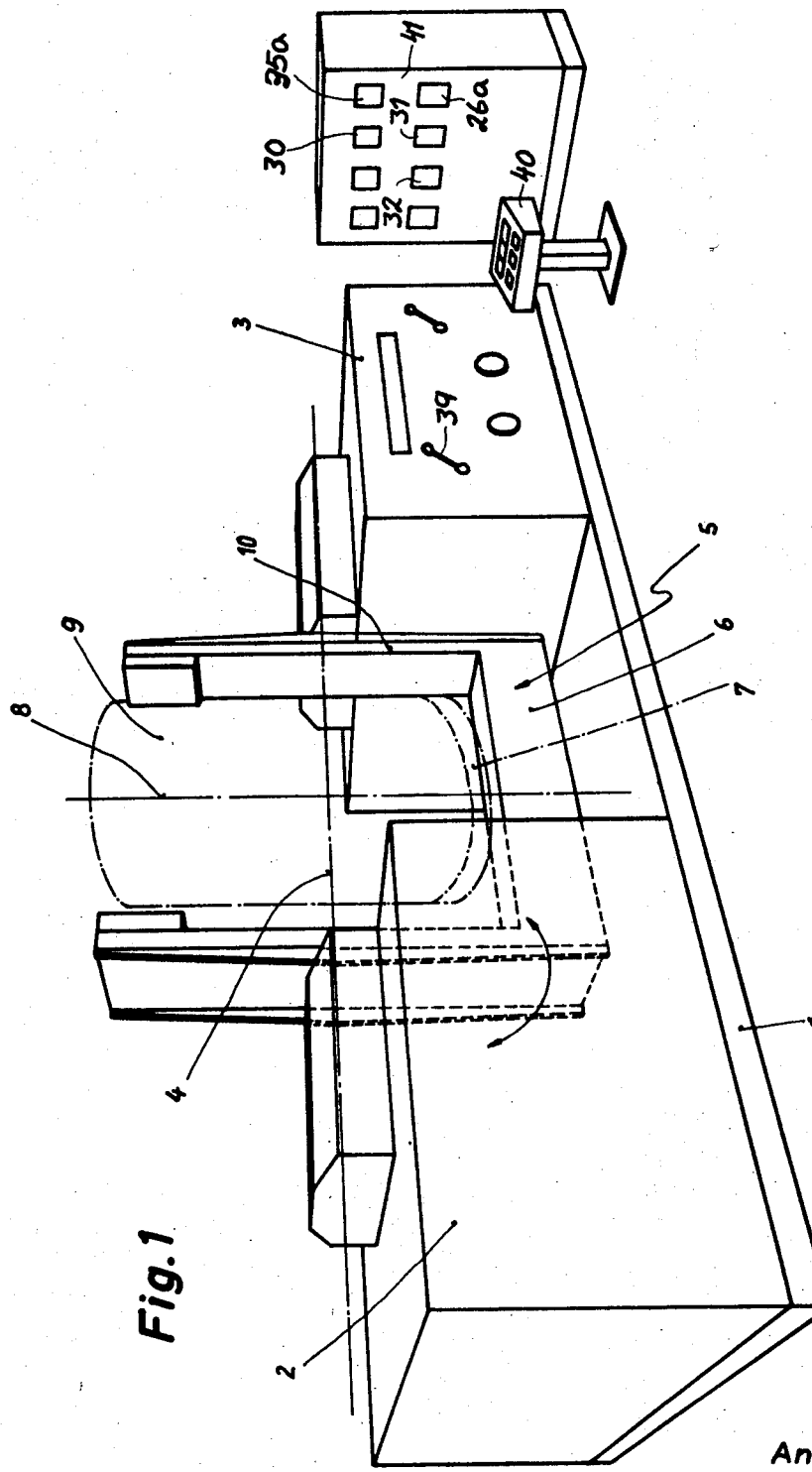
FIG. 1 is a perspective view of a rotational casting apparatus according to my invention.

As shown in FIG. 1, a base plate 1 carries two housings 2 and 3. The former serves to contain the heating and cooling equipment, and the latter houses the respective drives for the yoke and plate.

Between the housing 2 and 3 is a yoke 5 rotatable about an axis 4 and consisting of two hollow arms 10 and a base 6 bearing a disk 7 (shown in dot-dash lines) rotatable about an axis 8. A mold 9 shown also in dot-dash lines can be retained on this disk 7.

To the right of the apparatus is a control panel 40 and an instrument panel 41.

The whole apparatus here is very large, being capable of accepting double-wall molds several meters high and wide to make, for example, a tank with a capacity of 50,000 liters.

Figure 2:
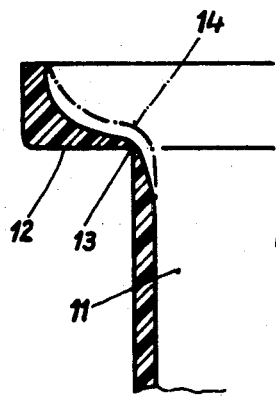
FIG. 2 is a section through a molded body illustrating principles of my invention.

FIG. 2 shows the upper corner of a large open-ended container 11. This is formed with an offset rim 12. With customary rotational casting apparatus a very weak portion is formed at 13 since the thermoplastic material just does not tend to build up such sharp corners. With my invention the wall thickness can be easily increased to correspond to dot-dash line 14. Here a more than adequate thickness is present at all points, even at the sharp edge 13.

Figure 3:
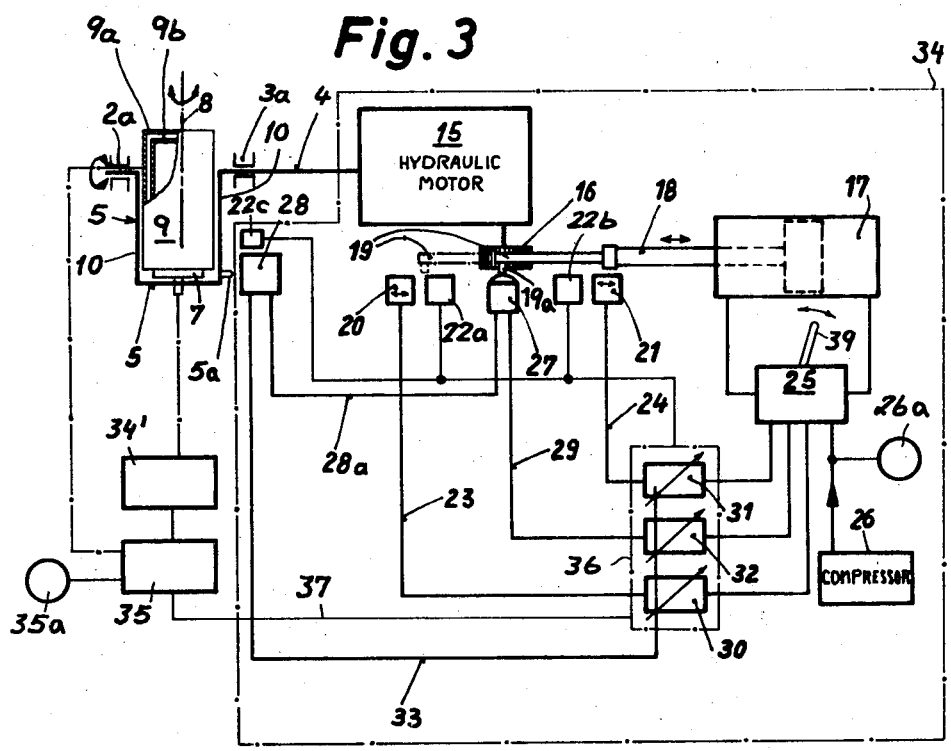
FIG. 3 is a largely diagrammatic view showing the control means for my invention.

FIG. 3 shows a control system 34 for rotation of the yoke 5 about the axis 4 and a similar second control system 34' not shown in detail for rotation of the disk 7 about the axis 8.

The yoke 5 is journaled in journal blocks 2a and 3a. The mold 9 is formed with two walls 9a and 9b between which steam or cool water can be flowed to melt and harden, respectively, the thermoplastic resin this apparatus is intended to cast. A combined heating and cooling unit 35, for generating the corresponding medium, with a temperature gauge 35a is connnected to the space between the walls 9a and 9b through the journal block 2a. A hollow shaft on the yoke 5 is advantageously provided for this purpose. The yoke 5 is thus preferably hollow to accommodate the conduits for the heating and cooling apparatus 35 and to accommodate the gear drive between the control and drive apparatus 34' and the mold 9, this latter drive being preferably led in through a hollow shaft of the yoke 5 journaled in the block 3a.

The control means 34 ( or 34' ) for the rotation of the yoke 5 (or disk 7). It is, however, to be understood that the same construction and operation principles apply to the control system 34' for rotation of the mold 9 about the axis 8 transverse to the axis 4.

A hydraulic motor 15 is coupled directly to the yoke 5 for rotating same about the axis 4. This motor 15 has a control wheel 16 in the form of a pinion. Thus the motor 15 here advantageously is a system having a hydraulic motor, a variable-displacement axial-piston pump coupled hydraulically thereto, and an electric motor driving the pump. The wheel 16 controls the angle of the swash plate in the motor and is therefore rotatable from a center position with the swash plate perpendicular to the pump axis, for no pumping action, to two end positions with increasing pumping of the pump in one direction or the other, depending on the angle of the swash plate. Thus the motor 15 is infinitely regulatable from zero rotation to full speed in two opposite senses.

A rack 19 formed with a lug 19a and mounted on the piston rod 18 of a double-acting pneumatic cylinder 17 serves to adjust this wheel 16. A solenoid-actuated valve 25 having a manual override control 39 is connected between this cylinder 17 and a compressed-air source in the form of a compressor with a meter 26a to operate the cylinder 17 in both directions. Thus, due to the meshing of the pinion 16 with the rack 19 of the cylinder 17, this cylinder controls the speed and sense of rotation of the motor 15.

The lug 19a of the rack 19 is engageable with two limit switches 20 and 21, with a center switch 27, and with two so-called "creep" switches 22a and 22b between the limit switches 20 and 21 and the center switch 27. A timer 36 consisting primarily of three delay timers 30, 31, and 32 connected by respective lines 23, 24 and 29 to the switches 20, 21 and 27, respectively, carries out a program of operations which are set up by controls not shown in further detail on the panel 40 (FIG. 1). A further switch 28 actuatable by a lug 5a on the yoke 5 is connected via a line 33 to the timer 36 and via a line 28a to the switch 27. A further creep switch 22c is connected with the others to the timer 36 and is arranged adjacent the switch 28. A line 37 connects the timer 36 to the heating-cooling apparatus 35.

An example of a normal operational sequence is given below:

First a charge of melted thermoplastic resin is introduced into the mold 9 which is being heated by the apparatus 35. The yoke 5 is then rotated about its axis 4 and the disk 7 about its axis 8 for a specified time of, say, 4 minutes. All this time the lug 19a is in contact with an actuating the switch 20, but the command from this to the valve 25 to reverse is held up by the timer 30 for these 4 minutes.

The original period having passed, the inside of the mold 9 is coated with an even layer of the melted thermoplastic resin. Then the timer 30 passes the signal of the switch 20 on the valve 25 starts the rack 19 moving back away from the switch 20. Meanwhile, the timer has enabled the creep switches 22a–c and the switch 28 so that when one of these switches is actuated the speed of the cylinder 17 is greatly reduced. Then when the switch 28 is tripped by the lug 5a, signalling that the yoke 5 is in a predetermined angular position since this switch 28 can be adjusted around the arc described by the yoke 5, the switch 27 is enabled and when the lug 19a strikes this latter the movement of the cylinder 17 is stopped.

The yoke 5 is held in this position briefly while still locating about the other axis 8 then the timer 36 signals the motor 17 to start again, at full speed.

As the lug 19a moves away from the center switch 27 the rotational speed in one sense of the . 15 increases until the switch 21 is engaged, this immediately signals a reversal of the cylinder 17 through the valve 25. The speed drops toward the center, corresponding to the arrival of the yoke at the top of its arc, and then rotation begins in the other sense as the lug 19a approaches again the switch 20. This is actuated, it reverses the cylinder 17, etc. The distance between the switches 20 ad 21 is adjustable so that the arc described by the yoke 5 can be very small, 90°, or anything up to 360°. During this rocking or oscillation of the yoke 5 a portion of the wall of the body being cast is sizeably thickened.

Once the rocking operation is completed the timer 36 again blocks the signals from the limit switches 20 and 21 by the timers 30 and 31 so that the yoke 5 continues rotating in the same direction. At the same time it causes the apparatus 35 to cool the mold 9 and therefore harden and partially cure the plastic mass therein.

As shown here the switch 28 serves to establish the starting point for the rocking of the yoke 5. It is set at the proper position adjacent the yoke for this purpose.

The creep switches 22a–c insure that the exact limits of the rocking are carefully established, and that the yoke 5 is stopped in the right position prior to beginning of the rocking movement.

As mentioned above, this description pertains to both the control apparatus 34 and the apparatus 34' (which similarly rocks the mold about axis 8), emphasis being made on the former for the sake of simplicity and clarity.

My invention applies equally to yokes bearing several such plates 7 upon which a plurality of such molds 9 are simultaneously rotated. It is further applicable to apparatus having yokes which are only suspended at one side and are adapted to be moved bodily into a heating and/or refrigeration chamber.

The improvement described and illustrated is believed to admit of many modifications within the ability of persons skilled in the art, all such modifications being considered within the spirit and scope of the invention except as limited by the appended claims.

I claim

1. A rotational casting apparatus comprising:
a mold rotatable about two mutually transverse axes;
drive means for rotating said mold about each of said axes;
control means including a pair of limit switches angularly offset about one of said axes and operatively coupled with said mold and connected to said drive means for automatic periodic reversal of the sense of rotation of said mold to oscillate same about said one of said axes through an angle of less than 360° as defined by said limit switches upon the enabling thereof;
stop means including a further switch connected with said drive means and operatively connected with said mold for arresting said mold at a selected predetermined angular position about said one of said axes upon the enabling of said further switch; and
timer means for enabling in succession said limit switches and said further switch in dependence upon a predetermined program.

2. The apparatus defined in claim 1, further comprising means operatively connected to said timer means for controlling the temperature of said mold.

3. The apparatus defined in claim 1, further comprising a yoke receiving said mold and rotatable about one of said axes, and a plate rotatable on said yoke about the other of said axes.

4. The apparatus defined in claim 3 wherein said drive means comprises at least one variable-speed reversible hydraulic motor connected to at least one of said axes.

5. The apparatus defined in claim 4 wherein said motor has a speed-regulating pinion with a null position wherein said motor 15 immobilized, said control means having at least one rack meshing with said pinion and shiftable from a center position corresponds to said null position to two opposite end positions corresponding to opposite sense of rotation of said motor.

6. A rotational casting apparatus comprising:
a mold rotatable about two mutually transverse axes;
drive means for rotating said mold about each of said axes;
control means operatively connected to said drive means for automatic periodic reversal of the sense of rotation of said mold to oscillate same about at least one of said axes through an angle of less than 360°;
stop means for arresting said mold at a predetermined angular position about said one of said axes;
timer means for enabling said control and stop means in dependence upon a predetermined program; and
a yoke receiving said mold and rotatable about one of said axes, and a plate rotatable on said yoke about the other of said axes, said drive means comprising at least one variable-speed reversible hydraulic motor connected to at least one of said axes, said motor having a speed-regulating pinion with a null position wherein said motor is immobilized, said control means having at least one rack meshing with said pinion and shiftable from a center position corresponding to said null position to two opposite end positions corresponding to opposite sense of rotation of said motor, said control means further comprising a double-acting pneumatic cylinder operatively connected to said rack, a source of compressed air, a solenoid-actuated reversing valve between said source and said cylinder, and a pair of limit switches adapted to be engaged by said rack in said end positions and connected to said valve to operate same.

7. The apparatus defined in claim 6, said stop means comprising a first switch engageable by said yoke at a predetermined angular position thereof, and a second switch engageable by said rack in said center position thereof, said first and second switches being connected to said valve and adapted to hold said rack into said center position therethrough.

8. The apparatus defined in claim 6, further comprising means for greatly decelerating actuation speed of said cylinder.

9. The apparatus defined in claim 6, further comprising means operatively connected to said timer means for controlling the temperature of said mold.